(12) United States Patent
Waddell et al.

(10) Patent No.: US 7,786,630 B2
(45) Date of Patent: Aug. 31, 2010

(54) SPRAY COOLED V-WEDGE FOR AEROSPACE GENERATOR

(75) Inventors: Simon L. Waddell, Tucson, AZ (US); William M. Scherzinger, Tucson, AZ (US); Gregor McDowall, Phoenix, AZ (US); Balwinder S. Birdi, Tucson, AZ (US); Michael W. Duddeck, Tucson, AZ (US); Edward M. Down, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 488 days.

(21) Appl. No.: 11/735,795

(22) Filed: Apr. 16, 2007

(65) Prior Publication Data

US 2008/0252155 A1 Oct. 16, 2008

(51) Int. Cl.
H02K 3/487 (2006.01)
(52) U.S. Cl. .............................. 310/58; 310/59; 310/52
(58) Field of Classification Search .................... 310/58, 310/52, 54, 59, 62, 63; H02K 3/487
See application file for complete search history.

(56) References Cited

U.S. PATENT DOCUMENTS

| 4,621,210 | A | 11/1986 | Krinickas, Jr. |
| 4,943,746 | A | 7/1990 | Scherzinger et al. |
| 5,347,188 | A | 9/1994 | Iseman et al. |
| 6,710,479 | B2 | 3/2004 | Yoshida et al. |
| 6,734,585 | B2 | 5/2004 | Tornquist et al. |
| 6,750,572 | B2 | 6/2004 | Tornquist et al. |
| 6,759,771 | B2 | 7/2004 | Doherty et al. |
| 6,879,083 | B2 | 4/2005 | Doherty et al. |
| 6,903,470 | B2 | 6/2005 | Doherty et al. |
| 6,909,211 | B2 * | 6/2005 | Ciciliani et al. ............... 310/58 |
| 7,015,616 | B2 | 3/2006 | Doherty et al. |
| 7,015,617 | B2 | 3/2006 | Tornquist et al. |
| 7,061,154 | B2 | 6/2006 | McDowall et al. |
| 2004/0051405 | A1* | 3/2004 | Doherty et al. ............... 310/58 |
| 2005/0023928 | A1* | 2/2005 | Doherty et al. ............. 310/270 |

* cited by examiner

Primary Examiner—Quyen Leung
Assistant Examiner—Naishadh N Desai
(74) Attorney, Agent, or Firm—Oral Caglar, Esq.

(57) ABSTRACT

A high speed generator cooling system directs a cooling oil spray through a chamber inside a coil support wedge assembly, which may be disposed adjacent to the generator coils. Heat from the generator coils may be conducted through the walls of the coil support wedge assembly and into the chamber where it is removed by the cooling oil spray passing through the chamber. The cooling oil passes through a generator rotor shaft and into a cooling passage in least one of the rotor laminations.

9 Claims, 7 Drawing Sheets

SPRAY COOLED V-WEDGE FOR AEROSPACE GENERATOR

BACKGROUND OF THE INVENTION

The present invention generally relates to electric machines and, more specifically, to apparatus and methods for cooling high speed generators using a cooling oil spray directed to the generator rotor coils.

Generator systems found in aircraft, ships and some terrestrial vehicles, may include three separate brushless generators, namely, a permanent magnet generator (PMG), an exciter, and a main generator. The PMG generates AC currents that are converted to a DC current that is provided to stator windings of the exciter. The exciter rotor generates AC current that is rectified to DC current and provided to rotor windings of the main generator, which generates a three phase AC output within the main stator windings that can be provided to a load such as, for example, an aircraft, ship, or vehicle electrical system.

The electrical load requirements for such generator systems are increasing. As a result, larger generators are needed which are capable of producing more power. However as the machines become longer it becomes increasingly difficult to remove heat from the center of the machine. One of the largest single areas of heat generation takes place in the rotor coils, so one prior approach is to apply a cooling oil spray to the rotor coil end turns. This cooling approach creates a temperature gradient between the end turns and the center of the rotor coil. The longer the machine the larger the temperature gradient. Due to the increasing length of modern aerospace generators the technique of cooling only the end turns of the rotor coils will not provide adequate cooling to the central region between the two coil ends. This results in unacceptably high temperatures at the rotor center, which can lead to a breakdown of winding insulation and failure of the machine. Other generator cooling systems rely on the conduction of heat to a cooling fluid passing across the rotor. However, such methods relying on cooling by conduction still do not provide adequate cooling to avoid hot spots near the center to the rotor.

The problem of cooling the center of a generator rotor presents a general limitation on the power density of electrical power generators of many different sizes and power output levels. In order to compensate for the excess heat at the rotor center, many generators must be made larger than would otherwise be required, thereby lowering the power density. However, increasing the size of the generator adds to the overall weight and cost of the electrical generation system.

As can be seen, there is a need for an improved cooling system for electrical generators that more effectively removes heat from all areas of the generator rotor, particularly the rotor central region. There is also a need for such a cooling system that is adaptable to a variety of sizes and types of generators and which can be applied to high speed, high power generator systems. There is a further need for a generator cooling system that will enable generators having greater power density, thereby reducing the cost and weight of the overall generator system.

SUMMARY OF THE INVENTION

In one aspect of the present invention, a high speed generator having a stator and a rotor rotationally mounted at least partially within the stator, comprises: a hollow shaft having an orifice extending between the shaft inner surface and outer surface; the rotor including at least a first and a second pole, each pole formed of at least one lamination and extending outward radially from the shaft, and each pole spaced apart from one another to form an interpole region therebetween; a coil support assembly positioned in the interpole region having a longitudinally extending hollow main body enclosing a chamber, the coil support assembly having a fluid port extending therethrough in communication with the chamber; a cooling fluid flow passage formed in the at least one lamination, the cooling fluid flow passage having an inlet in fluid communication with the shaft orifice and an outlet in fluid communication with the coil support assembly fluid port; and the shaft orifice, the coil support assembly fluid port and the lamination cooling fluid flow passage being configured such that cooling fluid passes from the shaft to the coil support assembly chamber.

In another aspect of the present invention, a rotor for use in a high speed generator comprises: a hollow shaft having at least one orifice extending between the shaft inner surface and outer surface; at least a first and a second pole, each pole formed of at least one lamination and extending outward radially from the shaft, each being spaced apart from one another to form an interpole region therebetween; at least one upper support wedge positioned in the interpole region and having a longitudinally extending hollow main body enclosing a chamber, the upper support wedge having a fluid port extending therethrough in communication with the chamber; at least one lower support wedge having a fluid port extending therethrough; at least one cooling fluid flow passage formed in the at least one lamination; the cooling fluid flow passage having an inlet in fluid communication with the shaft orifice and an outlet in fluid communication with the upper and lower coil support wedge fluid ports; and the shaft orifice and the lamination cooling fluid flow passage having narrow diameters such that cooling fluid passing from the shaft to the upper support wedge chamber under pressure enters the upper support wedge chamber as a cooling spray.

In a further aspect of the present invention, a cooling system for a high speed generator including a rotor rotating about an axis and having two ends, the cooling system including at least one cooling fluid pathway disposed at a longitudinal position between the two rotor ends, the cooling fluid pathway comprising: a hollow shaft rotating about the axis and having at least one orifice extending between the shaft inner surface and outer surface; at least a first and a second pole, each pole formed of at least one lamination and extending outward radially from the shaft, each pole spaced apart from one another to form an interpole region therebetween; a first coil wrapped around the first pole, the first coil including an outer surface; a second coil wrapped around the second pole, the second coil including an outer surface; at least one upper support wedge positioned in the interpole region and having a longitudinally extending hollow main body enclosing a chamber, the upper support wedge having a fluid port extending therethrough in communication with the chamber; at least one lower support wedge having a fluid port extending therethrough; and at least one cooling fluid flow passage formed in the at least one lamination, the cooling fluid flow passage having an inlet in fluid communication with the shaft orifice and an outlet in fluid communication with the upper and lower support wedge fluid ports, wherein the shaft orifice and the lamination cooling fluid flow passage have narrow diameters such that cooling fluid passing from the shaft to the upper support wedge chamber under pressure enters the upper support wedge chamber as a cooling spray.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a cooling system that can be used on a variety of types of electrical generators including high speed electrical generators used on aircraft, tanks, ships, and some terrestrial vehicles. Thus, although the present embodiment is, for convenience of explanation, depicted and described as being implemented in a brushless AC generator, it will be appreciated that the cooling system can be implemented in other AC generator designs needed in specific applications. Furthermore, in addition to being useful in electrical generators, the cooling techniques of the present invention can also be employed in other kinds of electrical machines, such as electrical motors.

The present invention provides for oil spray cooling of a generator rotor at the center of the rotor. In some previous cooling techniques, only the ends of the rotor and coils were sprayed, resulting in hot spots in the rotor center. In other previous cooling techniques a cooling fluid passing across the length of the rotor relied on conduction of heat by the cooling fluid, but did not use an oil spray. Oil spray is more effective in removing heat, in part due to the higher heat transfer coefficient. The present invention provides for cooling oil passages through the rotor that permit the direct spraying of a cooling oil spray to any region of the rotor, including the hottest region at the center.

Figure 1:
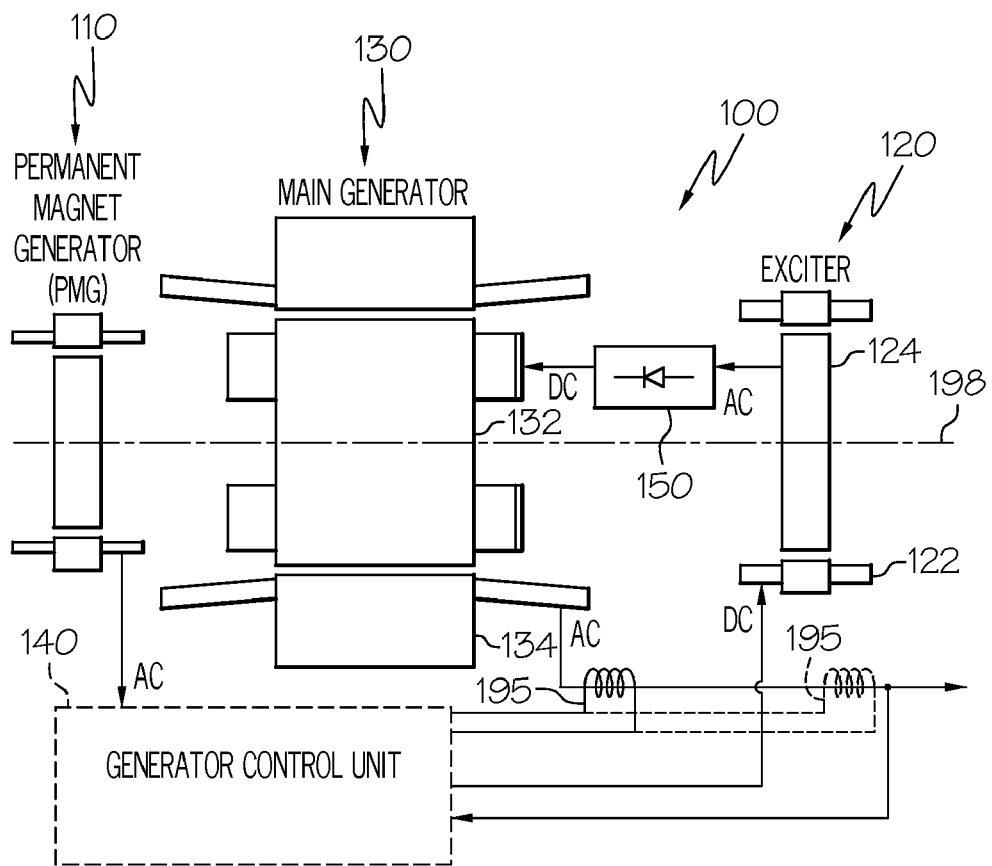
FIG. 1 is a functional schematic block diagram of an exemplary high speed generator system.

Turning now to FIG. 1, a functional block diagram of an exemplary high speed generator system 100 for use with a gas turbine engine such as those used in an aircraft, is depicted. This exemplary generator system 100, which is commonly known as a brushless AC generator, may include a permanent magnet generator (PMG) 110, an exciter 120 a main generator 130, a generator control unit 140, and one or more rectifier assemblies 150. During operation, a rotor 112 of the PMG 110, a rotor 124 of the exciter 120, and a rotor 132 of the main generator 130 all may rotate. The rotational speed of these components may vary. In one embodiment, the rotational speed may be, for example, in the range of about 12,000 to about 24,000 r.p.m., or greater. As the PMG rotor 112 rotates, the PMG 110 may generate and supply AC power to the generator control unit 140, which in turn may supply direct current (DC) power to a stator 122 of the exciter 120. The exciter rotor 124 may supply AC power to the rectifier assemblies 150. The output from the rectifier assemblies 150 may be DC power and may be supplied to the main generator rotor 132, which in turn may output AC power from a main generator stator 134.

The generator system 100 may be capable of providing output power at a variety of frequencies and over a variety of frequency ranges. Further, typically the output power from the main generator stator 134 may be three-phase AC power. The generator control unit 140 can regulate the power output based on monitoring signals provided to it from monitoring devices 195. In the depicted embodiment, the PMG rotor 112, the exciter rotor 124, and the main generator rotor 132 all typically rotate along a single axis 198 at the same rotational speed. A perspective view of a physical embodiment of at least those portions of the generator system 100 that may be mounted within a generator housing 200 may be provided in FIG. 2.

Figure 2:
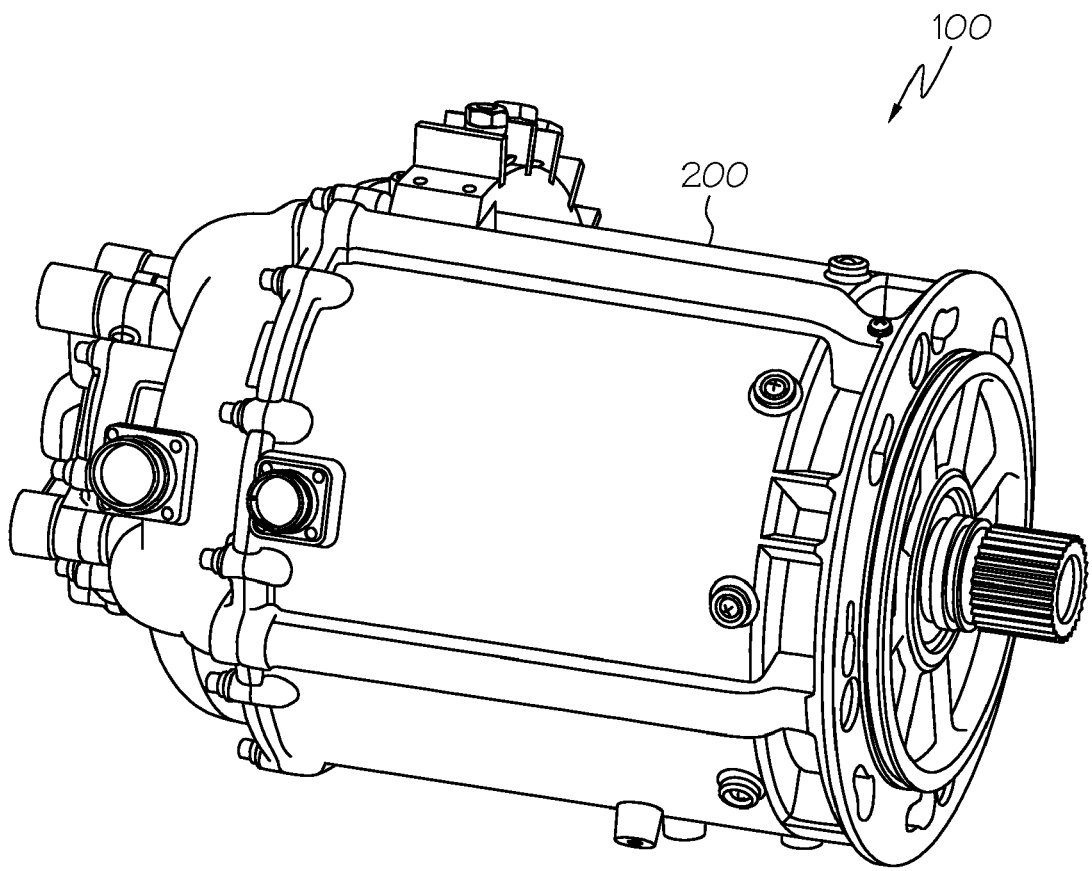
FIG. 2 is a perspective view of a physical embodiment of the generator system depicted in FIG. 1.
Figure 3:
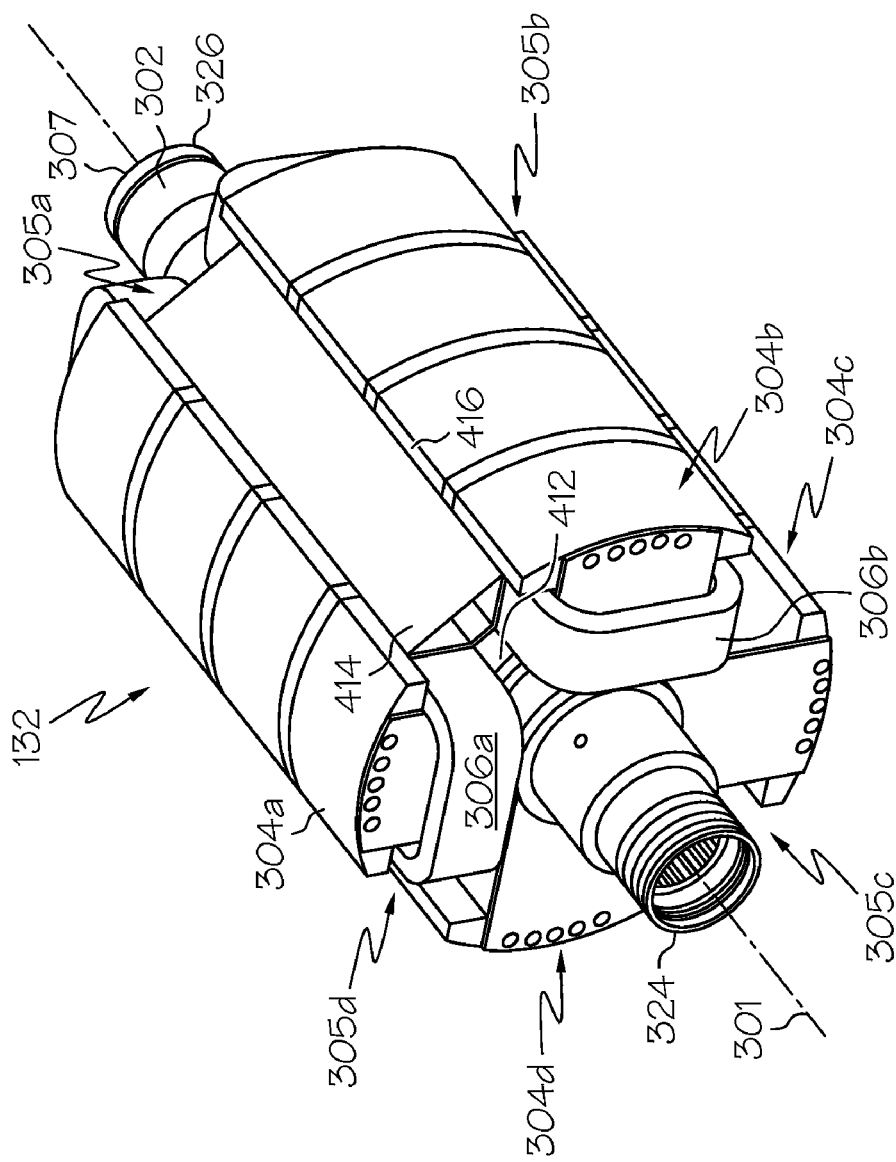
FIG. 3 is a perspective view of an exemplary embodiment of a partially assembled rotor assembly that may be used in the generator depicted in FIG. 2.
Figure 4:
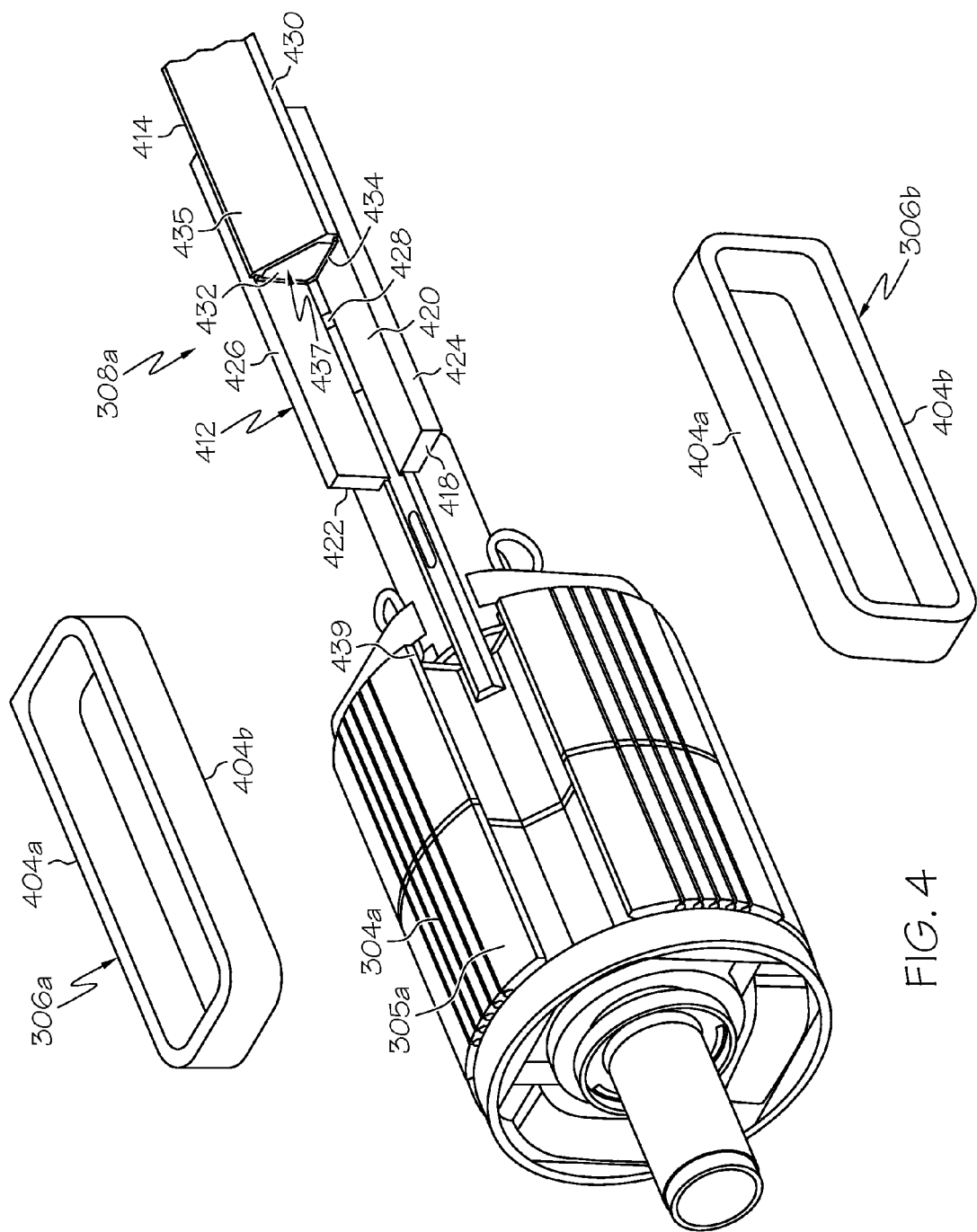
FIG. 4 is an exploded perspective view of the partially assembled rotor assembly depicted in FIG. 3.
Figure 5:
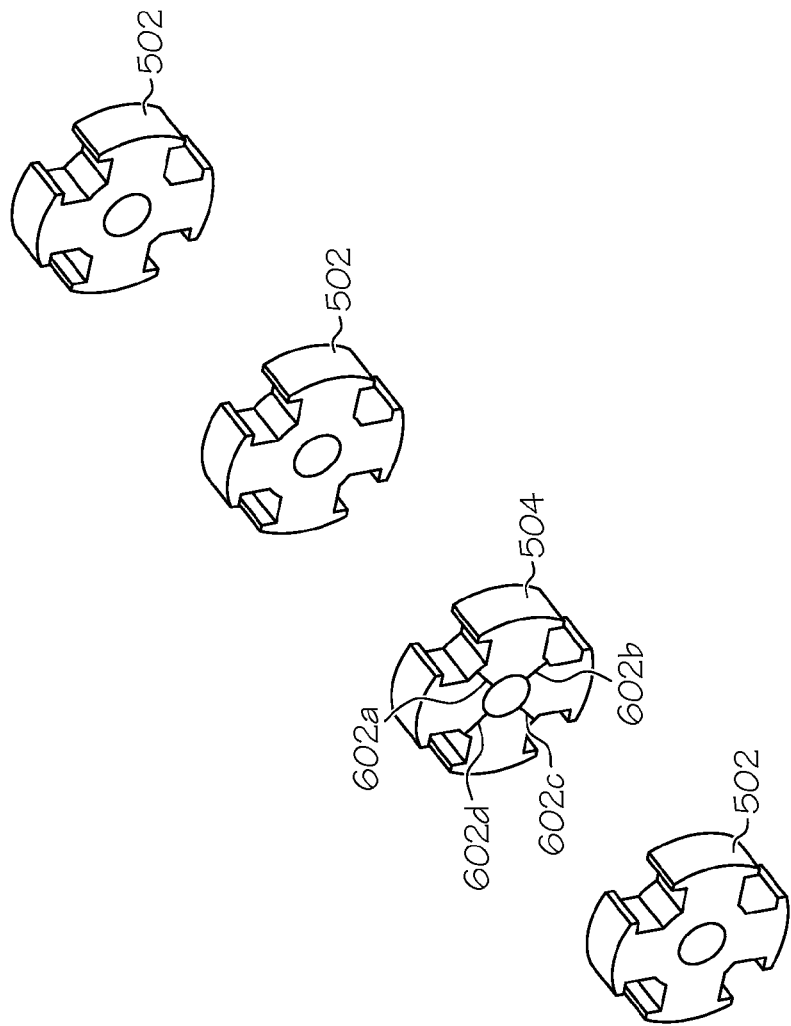
FIG. 5 is an exploded perspective view of a rotor core used in the rotor assembly depicted in FIGS. 3 and 4.

FIGS. 3-5 show perspective and exploded views of an exemplary embodiment of the main generator rotor 132, which may be used in the generator system illustrated in FIGS. 1 and 2, shown in a partially assembled configuration. As shown, the main generator rotor 132 may include a shaft assembly 302, a plurality of poles 304a-d, and a plurality of coils 306a-d (only two shown). The shaft assembly 302 may extend axially through the main generator rotor 132 along an axis 301, and may include a first end 324 and a second end 326. The first end 324 may be adapted to be coupled to a non-illustrated prime mover, which could be the afore-mentioned gas turbine engine, and thus may be referred to as the "drive end"; while the second end 326 may be referred to as the "anti-drive end". The shaft assembly 302 may be substantially hollow along most of its length, and may include an opening 307 in one end and may be preferably closed at the other end. In the depicted embodiment, the anti-drive end 326 may be open and the drive end 324 may be closed. A cooling fluid, such as oil, may be supplied to the generator and directed into the opening 307 in the anti-drive end 326 of the shaft assembly 302. As will be described in more detail further below, the shaft assembly 302 may include a plurality of orifices 503a-d (503d not shown) that may port oil within the shaft assembly 302, bringing it in close proximity to the coils 306a-d. The oil may be in the form of a cooling spray that circulates past the coils 306a-d, thereby removing heat.

The poles 304a-d may extend radially away from the shaft assembly 302 and may be generally spaced evenly apart from one another, forming an interpole region 305a-d between adjacent poles 304a-d. The poles 304a-d may be formed of a plurality of laminations 502 which may be shrunk fit onto the shaft assembly 302. The laminations 502, as is generally known, may a plurality of laminations laminated together in a continuous manner forming a stack. Each one of the laminations 502 may be composed of a magnetically permeable material. The particular material may be any one of numerous magnetically permeable materials. In one exemplary embodiment, the laminations 502 may be formed of a magnetic alloy material such as, for example, Vanadium Permendur. It will be appreciated that while only four laminations 502 are shown in FIG. 5, the number of laminations 502 may be much larger; typically 100-200 laminations may be used forming a rotor that may be, for example, about 5 inches long. It should also be appreciated that the laminations 502 are shown pictorially thicker to aide understanding.

In accordance with the present invention, a centrally located lamination, 504 may be made thicker than the other laminations 502, for example, about ⅛ inches thick. This is to facilitate the inclusion of a plurality of cooling flow passages 602a-d for directing cooling oil from the shaft assembly 302 to the coils 306a-d, as described in more detail below. The coils 306a-d may be wrapped, one each, around a respective pole 304a-d and may be preferably formed by wrapping numerous individual wire windings around the respective poles 304a-d. It is noted that the coils 304a-d may be formed of any one of numerous conductors but in a preferred embodiment may be formed from copper.

As shown in FIGS. 3 and 4, coil support assemblies 308a-d (only one shown) may be positioned within each of the interpole regions 305a-d, and provide lateral support for the coils 306a-d. Each coil support assembly 308 includes a lower support wedge 412, an upper support wedge 414. The lower support wedges 412 each include a main body 418 that may be substantially trapezoidal in shape, and may include top and bottom surfaces 420 and 422, respectively, and first and second opposed side surfaces 424 and 426, respectively. The lower support wedges 412 may each be disposed in one of the interpole regions 305a-d, such that the side surfaces 424, 426 may contact the inward-facing edges of the coils 306a-d. The main body 418 additionally may include one or more openings 428 that may extend between the top and bottom surfaces 420, 422. Openings 428 may be cut into the lower support wedge coinciding with the orifices 503a-d in the shaft assembly 302. These openings 428 may allow oil to pass from the shaft assembly 302 through the lower support wedge 412.

Figure 6:
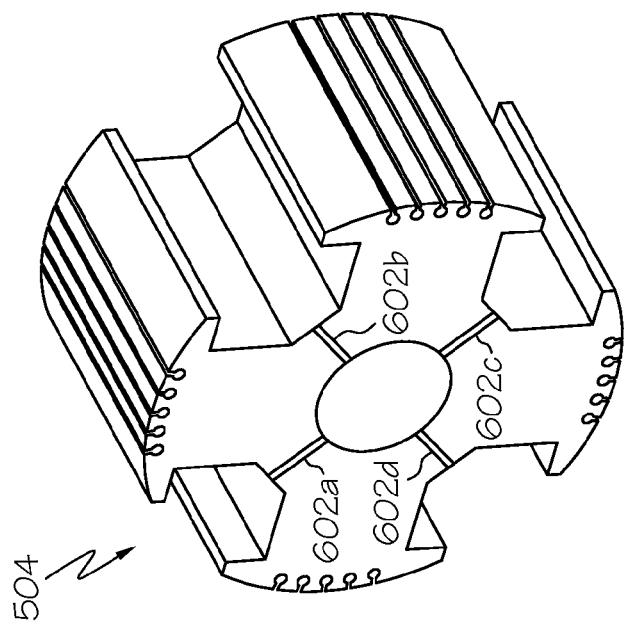
FIG. 6 is a perspective view of a rotor lamination used in the rotor core depicted in FIG. 5.

The upper support wedges 414 each may include a longitudinally extending main body 430, an inner surface 432, an outer surface 434 and a top surface 435 The top surface 435 may enclose the inner surface 432 and may form an upper support wedge chamber 437. As with the lower support wedges 412, the upper support wedges 414 may be each disposed in the interpole regions 305a-d; however, the upper support wedges 414 may be configured such that the upper support wedge outer surfaces 434 contact outer surface sides 404a,b of the coils 306a-d. The upper support wedges 414 may be held in place by placing the top surface 435 of the upper wedge 414 beneath pole tips 439 of the laminations 502. Together, the lower support wedges 412 and the upper support wedges 414, may prevent movement of the coil support assemblies 308a-d at relatively high rotor rotational speeds As previously mentioned, cooling oil may be directed into the opening 307 in the shaft assembly anti-drive end 326. Reference is now made to FIGS. 5 and 6, FIG. 6 being a perspective view of one side of the centrally located lamination 504. Cooling oil may be directed out of four orifices 503a-d, which may be located around the circumference of the shaft assembly 302, spaced 90 degree angles apart from each other. The orifices 503a-d may be collocated with four cooling fluid flow passages 602a-d. The cooling fluid flow passages 602a-d may be machined onto the side of the centrally located lamination 504. Centrally located lamination 504 may be preferably located at or near the center of the rotor and may be preferably thicker than the other laminations to allow for the inclusion of the cooling fluid flow passages 602a-d. It will be appreciated that when an adjacent lamination 502 may be attached to the centrally located lamination 504 shown in FIG. 6, cooling fluid flow passages 602a-d may be enclosed to form narrow passages for the passage of cooling oil. In an exemplary embodiment, the cooling fluid flow passages may be between about 0.040 and 0.080 inches in diameter. Alternatively, cooling fluid flow passages 602a-d may be drilled into the rotor laminations 502 after they are assembled. It should be noted that, while this embodiment may use four cooling fluid flow passages, more or fewer could be used depending on the cooling requirements of the system.

Figure 7:
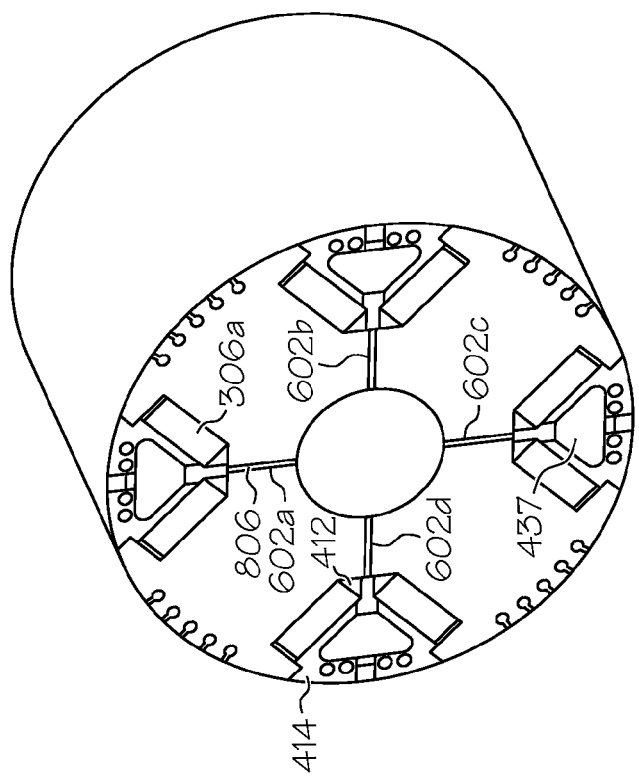
FIG. 7 is a cross section view of an assembled rotor assembly taken at the edge of one of the laminations of the rotor assembly shown in FIGS. 3 and 4.
Figure 8:
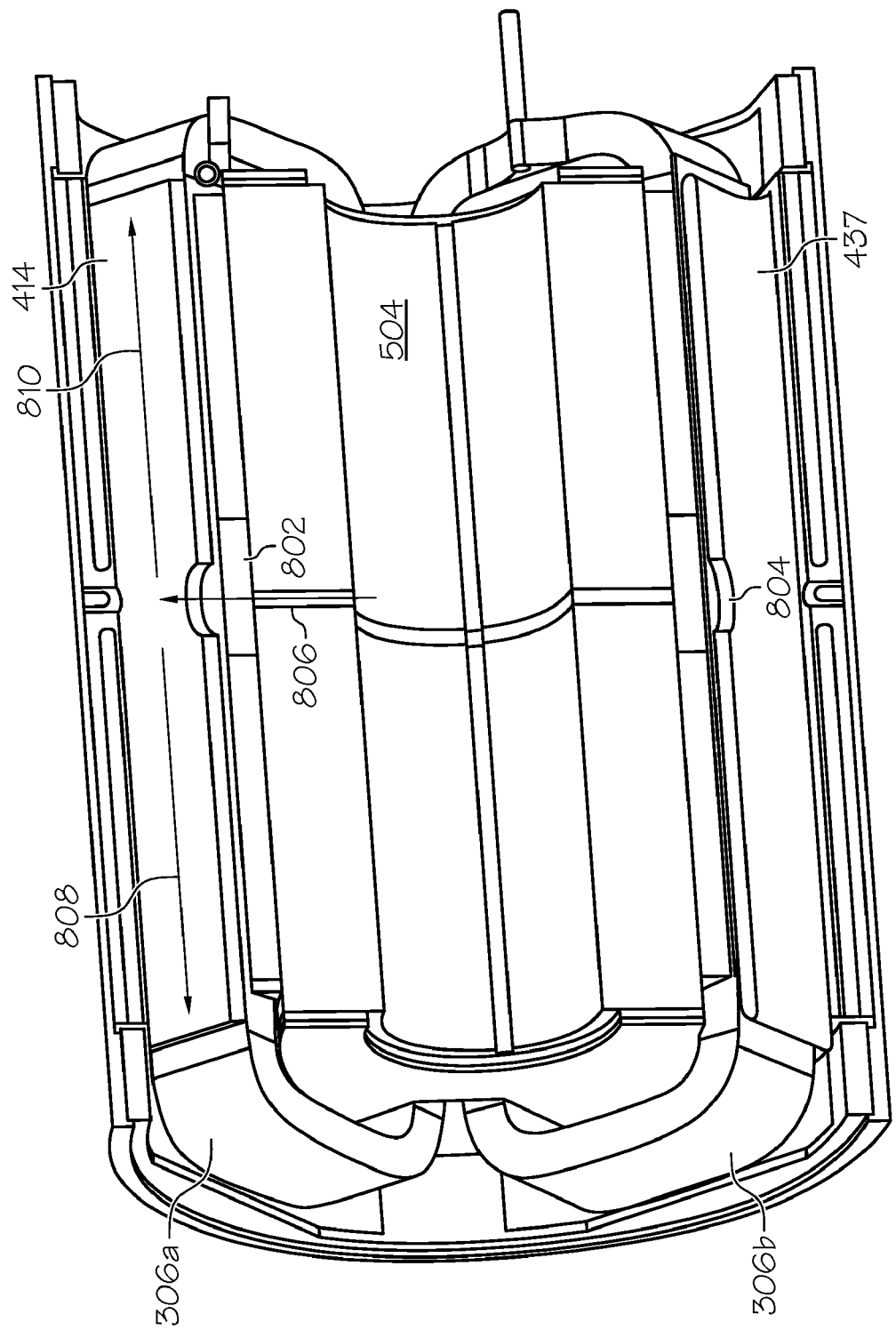
FIG. 8 is a cross section view of the rotor assembly shown in FIGS. 3 and 4 taken longitudinally along the rotational axis of the rotor.

Reference is now made to FIG. 7, which is a cross section view of the assembled main generator rotor 132, and to FIG. 8, which is a longitudinal cross section view of the assembled main generator rotor 132. FIG. 7 shows one side of the centrally located lamination 504 shown in FIG. 6. It is seen that the cooling oil may be supplied to the shaft 302, and then may be directed out the plurality of orifices 503a-d and into the collocated cooling fluid flow passages 602a-d. Upon exiting the cooling fluid flow passages 602a-d, cooling oil may pass through fluid ports 802 in each of the lower support wedges 412 and then through fluid ports 804 in each of the upper support wedges 414. Fluid ports 802 and 804 may be collocated with the cooling fluid flow passages 602a-d. After passing through fluid ports 802 and 804, cooling oil may enter the upper support wedge chamber 437. As shown by the arrows 806, 808 and 810 within the upper support wedge chamber 437, the path of the cooling oil may diverge to the left and to the right of the upper support wedge fluid port 804 and flow along the length of the upper support wedge chamber 437, whereupon it may flow past the ends of the coils 306a-d. After passing beyond the ends of the coils 306a-d, the cooling oil may enter the interior of the generator housing 200 where it may be circulated in a conventional manner. By flowing the oil through the complete length of the upper wedge the amount of oil entering the machine air gap is minimized, thus reducing extra heat generated due to windage.

In accordance with an exemplary embodiment of the invention, the cooling oil may preferably enter the upper support wedge chamber 437 as a spray. The cooling oil may be converted from a homogeneous liquid state to a spray by the action of the oil pressure, the size of the orifices 503a-d and cooling fluid flow passages 602a-d, as well as by the effects of centrifugal force on the oil as the rotor 132 spins at a high r.p.m. The cooling action of the cooling oil in the form of a spray may be much greater than if it were in the homogeneous liquid state due to the increased heat transfer coefficient. As a result, the upper support wedge 414 and lower support wedge 412 may be cooled, which may cool the coils 306a-d because of the thermal contact therebetween.

To facilitate cooling of the coils 306a-d, which may generate most of the heat in the main generator rotor 132, the upper support wedges 414 may have a relatively large portion of their surface area in thermal contact with the coils 306a-d. In addition, the upper support wedges 414 may be preferably made of a material with a relatively high thermal conductivity. For example, in an exemplary embodiment, the upper support wedges 414 may be made of aluminum. Both the substantial surface contact with the coils 306a-d and the high thermal conductivity of the upper support wedges 414 may greatly facilitate the transfer of heat from the coils 306a-d. This heat transfer may occur through the walls of the upper support wedges 414 to the cooling oil spray in the upper support wedge chamber 437. An insulating layer of conventional electrically insulating paper (not shown) may be typically used between the coil support assemblies 308a-d and the coils 306a-d. Heat transfer from the coils 306a-d may be further enhanced by instead using a high electrically insulating, high thermal conductivity coating applied directly to the coil support assemblies 308a-d.

Furthermore, since the present invention may enable cooling fluid flow passages 602a-d to be located at or near the center of the rotor 132, usually the hottest part, effective cooling may be applied where it is needed most. Depending on the requirements of any particular application, and the length of the rotor, additional cooling flow passages 602a-d may be provided longitudinally along the length of the rotor 132 to further improve cooling of the generator.

Furthermore, by applying an oil spray to the center of the rotor, the present invention may achieve superior cooling by removing heat from the hottest part of the rotor. Reducing the temperature of the coils at the center of the rotor may reduce the incidence of failures from overheating of the coils. The cooling system of the present invention also may permit the design of generators with greater power density because more effective cooling may permit the use of a smaller generator to produce a given amount of electrical power. While the exemplary embodiments discussed above related to high power generators, the invention can be used in generators of a wide variety of sizes and power ratings. The invention can also be used for other rotating electrical machines besides generators, including motors.

It should be understood, of course, that the foregoing relates to exemplary embodiments of the invention and that modifications may be made without departing from the spirit and scope of the invention as set forth in the following claims.

We claim:

1. An electric machine having a stator and a rotor rotationally mounted at least partially within said stator, comprising:
   a hollow shaft having at least one orifice extending between a shaft inner surface and a shaft outer surface;
   at least a first and a second pole, extending outward radially from said shaft, each pole spaced apart from one another to form an interpole region therebetween, wherein said first and second poles are formed from a plurality of laminations laminated together in a continuous manner forming a stack;
   a coil support assembly positioned in said interpole region and having a longitudinally extending hollow main body enclosing a chamber, said coil support assembly having a coil support assembly fluid port extending therethrough in communication with said chamber;
   at least one lamination cooling fluid flow passage centrally located in one of the plurality of laminations in said stack, said lamination cooling fluid flow passage being in direct radial communication with said at least one orifice;
   a cooling fluid flow passage formed in said interpole region, said cooling fluid flow passage having an inlet in direct radial fluid communication with said at least one lamination cooling fluid flow passage and an outlet in direct radial fluid communication with said coil support assembly chamber; and
   said shaft orifice, said coil support assembly fluid port, and said lamination cooling fluid flow passage configured such that cooling fluid passes from said shaft to said coil support assembly chamber.

2. The electric machine of claim 1 further comprising:
   a first coil wrapped around said first pole, said first coil including an outer surface;
   a second coil wrapped around said second pole, said second coil including an outer surface; and
   wherein said coil support assembly is in thermal contact with at least a portion of said first coil outer surface and at least a portion of said second coil outer surface.

3. The electric machine of claim 2 wherein said coil support assembly comprises:
   an upper support wedge having a longitudinally extending main body enclosing said chamber and including at least an inner surface and an outer surface, said upper support wedge outer surface being in thermal contact with at least a portion of said first and second coil outer surfaces, whereby heat transfer occurs between said first and second coil outer surfaces, said upper support wedge, and said cooling fluid in said chamber.

4. The electric machine of claim 3 wherein said first and second coils each further include an inward facing edge that substantially faces said shaft, and wherein said coil support assembly further comprises:
   a lower support wedge adjacent to said interpole region, said lower support wedge having a longitudinally extending main body, said main body including an outer surface having a top, a bottom, and first and second opposed sides having an opening in fluid communication with said cooling fluid flow passage whereby cooling oil to pass through to said chamber in said upper support wedge.

5. The electric machine of claim 1 wherein said coil support assembly upper support wedge is composed of thermally conducting material.

6. The electric machine claim 5 wherein said upper support wedge is composed of aluminum.

7. The electric machine of claim 1 wherein said cooling fluid flow passage is between 0.040 and 0.080 inches in diameter.

8. The electric machine of claim 1 wherein at least one of said orifices and said cooling flow passages are located longitudinally approximately at the middle along the length of said hollow shaft.

9. The electric machine of claim 1, said poles further comprising a plurality of laminations attached together in a stack.

* * * * *